US009328808B2

(12) United States Patent
Thiery et al.

(10) Patent No.: US 9,328,808 B2
(45) Date of Patent: May 3, 2016

(54) ACTUATOR

(71) Applicant: Cooper-Standard Automotive (Deutschland) GmbH, Schelklingen (DE)

(72) Inventors: Christoph Thiery, Mannheim (DE); Manuel Schieker, Mannheim (DE); Bernhard Klipfel, Karlsruhe (DE)

(73) Assignee: Halla Visteon Climate Control Corporation, Daejeon-Si (KR)

( * ) Notice: Subject to any disclaimer, the term of this patent is extended or adjusted under 35 U.S.C. 154(b) by 444 days.

(21) Appl. No.: 13/653,754

(22) Filed: Oct. 17, 2012

(65) Prior Publication Data
US 2013/0098181 A1   Apr. 25, 2013

(30) Foreign Application Priority Data
Oct. 17, 2011   (EP) .................................... 11185391

(51) Int. Cl.
*F16H 21/52*   (2006.01)
*F02B 37/18*   (2006.01)
*F16K 31/528*   (2006.01)

(52) U.S. Cl.
CPC .............. *F16H 21/52* (2013.01); *F02B 37/186* (2013.01); *F16K 31/528* (2013.01); *Y02T 10/144* (2013.01); *Y10T 74/1828* (2015.01)

(58) Field of Classification Search
CPC ...... F16K 31/528; F16H 21/52; F02B 37/186
USPC ........................ 74/424.5, 425, 50, 53, 54, 55; 123/568.21, 568.23, 568.24, 568.26; 251/129.01, 129.11, 129.2, 129.03, 251/228, 251, 318, 323
See application file for complete search history.

(56) References Cited

U.S. PATENT DOCUMENTS

| 373,072 | A | * | 11/1887 | Jarvis | 92/167 |
| 4,089,505 | A | * | 5/1978 | Anderle et al. | 251/129.11 |
| 4,256,019 | A | * | 3/1981 | Braddick | 92/94 |
| 4,403,538 | A | * | 9/1983 | Rise | 92/94 |
| 4,941,672 | A | * | 7/1990 | Godin | 180/409 |
| 4,993,730 | A | * | 2/1991 | Galtier et al. | 180/409 |
| 6,039,034 | A | * | 3/2000 | Field et al. | 123/568.23 |
| 6,886,546 | B1 | * | 5/2005 | Bircann et al. | 123/568.23 |
| 8,171,919 | B2 | | 5/2012 | Klipfel et al. | |
| 2012/0036950 | A1 | | 2/2012 | Klipfel et al. | |

FOREIGN PATENT DOCUMENTS

| DE | 46 204 | 4/1888 |
| DE | 2 211 955 | 9/1973 |
| DE | 10 2008 004 688 | 7/2009 |
| JP | 2005 315 179 | 11/2005 |

OTHER PUBLICATIONS www.507movements.com Online reproduction of 507 Mechanical Movements, by Henry T Brown. Images from 21st Ed., 1908.*

* cited by examiner

*Primary Examiner* — William Kelleher
*Assistant Examiner* — Gregory Prather
(74) *Attorney, Agent, or Firm* — Knobbe, Martens, Olson & Bear, LLP

(57) ABSTRACT

An actuator for a lever that is connected, with a valve or a wastegate or a variable turbine geometry of an exhaust gas turbocharger. The actuator includes a connecting rod between a drive and the lever. The connecting rod is rotatably supported at a location some distance from the lever. The connecting rod is further guided between the support and the lever on a circular arc.

17 Claims, 2 Drawing Sheets

ACTUATOR

CROSS-REFERENCE TO RELATED APPLICATIONS

This application claims priority to European Application No: EP 11185391.7, filed Oct. 17, 2011, the entirety of which is incorporated herein by reference.

BACKGROUND OF THE INVENTION

1. Field of the Invention

The invention relates to an actuator for a lever, which can be connected, for example, to a valve or a wastegate or a variable turbine geometry of an exhaust gas turbocharger.

In particular with the uses mentioned as examples, valves or other components must be pivoted typically with the help of a lever that is attached to a valve axle or a corresponding axle.

2. Description of the Related Art

In particular in view of the use in a wastegate or in a variable turbine geometry of an exhaust gas turbocharger, reference is the made regarding further details to the European patent application 10 172 629 as filed by applicant, the disclosure of which is being made the subject matter of this present application as regards the details of the wastegate, the variable turbine geometry and the actuator.

In addition, an actuator is known from DE 10 2008 004 688 A1 for actuation of a valve in a turbocharger, in which the lever of a drive is connected to the lever connected to the valve by means of a connecting rod having at least one ball joint.

JP 2005315179 pertains to a valve for an exhaust gas turbocharger that is actuated by a pressure cylinder, the output rod of which is guided translationally in a friction element. However, this guidance can be improved upon in view of the fact that said output rod which is connected by a lever to the valve performs at least a minor swivel movement during pivoting of the valve.

U.S. Pat. No. 4,256,019 forms the prior art document that falls under the preamble of claim 1. U.S. Pat. No. 373,072, U.S. Pat. No. 6,352,109 B1, DE 2 211 955, DE 46 204 and U.S. Pat. No. 4,840,350 are further prior art.

SUMMARY OF THE INVENTION

The invention is accordingly based on the object to provide an actuator for a lever, which takes the necessary kinematics into account and which is improved as regards exactness and/or the forces which occur.

The solution of this object is achieved by the actuator described in claim 1.

Accordingly, this actuator comprises a connecting rod between a drive and the lever, which is rotatably supported at a location at a distance from the lever and which is guided between this support and the lever on a circular arc. As mentioned above, the lever is connected, for example, with a valve or a wastegate or a variable turbine geometry of an exhaust gas turbocharger. The lever can be any component, and could, for example, be a bar-shaped component, that is connected either directly or indirectly with the rotational axle of said component such that a rotation of the lever causes a rotation of the component. A point on the lever at a distance from the rotational axle, at which, for example, the connecting rod is attached, moves along a circular arc when the lever rotates. Accordingly, the connecting rod is also subject to this movement which, according to the invention, is made possible by the rotatable support of the connecting rod at a location on the connecting rod at a distance from the lever.

In order to allow this pivotal movement to progress in a defined manner and at the same time with as little friction as possible and with as little lateral forces as possible, the connecting rod is guided between the support and its point of attachment to the lever on a circular arc. Thus, in view of the connecting rod, it is ensured that there is a defined movement without substantial lateral forces and/or friction occurring, and by this the exactness during actuation of a valve or of a similar means by means of a lever is ensured. The above-mentioned valve can be an exhaust gas recirculation valve or any valve, for example a valve from the motor vehicle sector.

Preferred embodiments are described in the subsequent claims.

At present it is preferred to accommodate the connecting rod in a guide element such that the connecting rod is movable in the guide element in the longitudinal direction of the rod in order to transmit a translational movement from a drive to the lever. The guide element comprises suitable structures, for example structures shaped like circular arcs, which cooperate with complementary structures in a (stationary) guide block in which the guide element is accommodated.

Particularly preferred at present is the formation of the guide element with a sheath in which the connecting rod is accommodated.

For the rotatable support of the connecting rod, a roll can be provided by means of which the rotatable support of the connecting rod is effected. The roll can be provided, for example, in a suitable manner at an end of the connecting rod and can cooperate with a contour on an output element of the drive.

The drive is a rotary drive. As translational drives, pressure chambers or solenoids are conceivable. In contrast to, for example, the guidance of the output rod of the actuator, which acts as connecting rod to the lever, that is provided in the prior art by means of a frictional element, excess friction and lateral forces can be avoided by the measures according to the invention. As a rotary drive, a suitable electric motor having optionally a downstream gearing mechanism can be used.

The output element of a rotary drive, on which the connecting rod can be rotatably supported, has a worm gear or a threaded element. In view of the details of the threaded element, reference is made to EP 2 172 682 A1 of applicant as well as to the documents cited therein, the disclosure of which regarding the threaded element are herewith made the subject matter of the present application. In particular, the rotation axis of the threaded element can be tilted, put mathematically, skewed, towards the connecting rod. With a worm gear, it is preferred in contrast to this that the rotation axis of the worm gear is perpendicular to the longitudinal extension of the connecting rod.

It has also turned out to be favorable for the exactness when transmitting the movement to the connecting rod to guide its pivot in a stationary linear guidance. As mentioned, the connecting rod typically moves substantially along its longitudinal direction and pivots thereby at least to a minor degree. In order to avoid with this movement an (undesired) pivoting or transverse movement in the region of the pivot of the connecting rod, said guidance is preferably provided.

Some embodiments relate to an actuator system. The actuator system can include, for example, a connecting rod having a first end and a second end and defining a longitudinal axis extending therebetween and a rotary drive having a worm gear. In some embodiments, the first end of the connecting rod can be connected to the rotary drive such that a rotation of the rotary drive longitudinally displaces the connecting rod. The actuator system can include, for example, a lever that is connected to the second end of the connecting rod such that the longitudinal displacement of the connecting rod displaces the lever and a guide element having a sheath and a protrusion. In some embodiments, the connecting rod can extend through the sheath.

In some embodiments of the actuator system, the protrusion located on the guide element can have an arc that has and is defined by a length, a center, and a radius. In some embodiments, the actuator system can include support block that can support the guide element. In some embodiments of the actuator system, the support block can have an arcuate contour that has and is defined by a length, a center, and a radius and that can receive the protrusion. In some embodiments of the actuator system, the radius of the arc of the protrusion is the same as the radius of the arcuate contour. In some embodiments of the actuator system the arcuate contour can be a groove, and, for example, the length of the groove can be larger than the length of the protrusion such that the protrusion can move within the groove relative to the center of the arcuate contour. In some embodiments of the actuator system, the lever can be rotatable about a point such that the longitudinal displacement of the connecting rod results in the rotation of the lever. In some embodiments of the actuator system, the support block can be positioned relative to the lever such that the rotation of the lever results in the movement of the protrusion in the groove relative to the center of the arcuate contour.

In some embodiments, the actuator system can include a linear guide. In some embodiments of the actuator system, the linear guide can be stationary relative to the rotary drive and relative to the connecting rod. In some embodiments of the actuator system the linear guide can direct the movement of the first end of the connecting rod when the rotary drive is rotated.

In some embodiments of the actuator system, the connecting rod can include a roll. In some embodiments of the actuator system the roll can be located at the first end of the connecting rod and can contact the rotary drive.

In some embodiments of the actuator system, the worm gear can have a worm-shaped contour. In some embodiments of the actuator system the worm-shaped contour can be, for example, a spiral.

BRIEF DESCRIPTION OF THE DRAWINGS

One embodiment of the invention is illustrated in more detail below with reference to the drawings. In these drawings.

DETAILED DESCRIPTION OF THE PREFERRED EMBODIMENT

Figure 1:
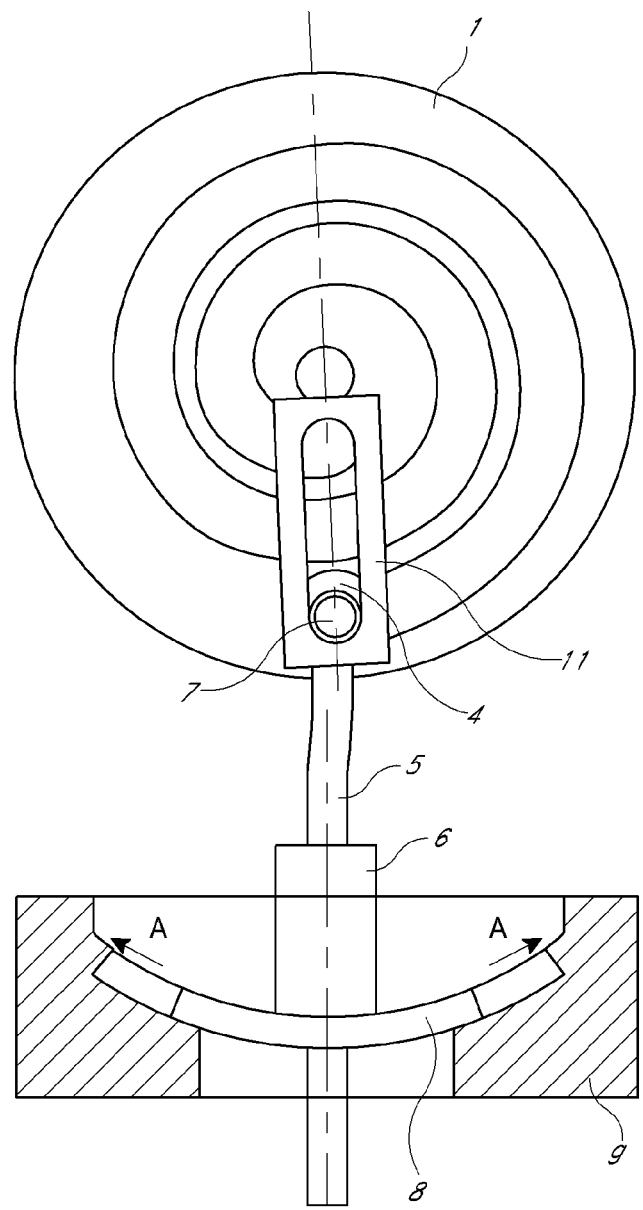
FIG. 1 illustrates parts of the actuator according to the invention in a partially sectioned plan view.

In FIG. 1, a worm gear 1 having a corresponding worm-shaped contour can be recognized as the output element of a drive. In this contour a roll 4 is accommodated, as is more evident in FIG. 2, which is rotatably attached to an axle 7 at the upper end of a connecting rod 5. As is evident from FIG. 1, a rotation of the worm gear 1 in a clockwise direction causes the connecting rod 5 to rise since the worm-shaped groove approaches the center point of the worm gear. Thus, the connecting rod 5 (according to the drawing in FIG. 1) can be lifted with a rotation of the worm gear in said direction, and a lever 10 (see FIG. 2) attached at the lower end of the connecting rod can be turned, if it extends in any direction tilted relative to the connecting rod 5, in order to rotate a valve element, for example.

The smaller the angle between the lever 10 and the connecting rod in the situation shown in FIG. 1, the more the connecting point between the lever 10 and the connecting rod moves in a direction transverse to the connecting rod. Even if the lever 10 in the situation shown in FIG. 1 is arranged in a direction perpendicular to the connecting rod, said connecting point moves along, when the connecting rod moves upwardly, a circular path and thus moves (also) in a lateral direction. This movement necessarily follows the connecting rod which is rotatably attached at the connecting point to the lever 10, and therefore moves at least to a minor extent in the direction of arrows A. This movement on a circular path is carried out according to the invention in that in the embodiment shown, the connecting rod 5 is accommodated in a guide element 8 having a sheath 6.

In order to make the upward and downward movement of the connecting rod 5 possible that is described above, this rod is translatable in its longitudinal direction within the sheath 6. In the situation shown, however, protrusions shaped like circular arcs are formed at the lower end of the sheath at the guide element 8, which are accommodated in a guide block 9 in complementary contours, for example grooves or slots. By this, a defined movement takes place also with a combined translational and pivotal movement of the connecting rod 5, without excessive frictional or lateral forces occurring. The pivotal movement of the connecting rod 5 takes place in particular about the roll 4 accommodated in the worm contour.

The connecting rod 5 is formed in the embodiment shown (see FIG. 2) at its upper end essentially in the shape of a T. In the embodiment shown, the roll 4 is rotatably supported at the arm of the "T" facing the worm gear, and at the arm facing the observer in FIG. 1, this area of the connecting rod 5 is accommodated in a linear guide 11 that is stationary. When the connecting rod therefore moves upwardly owing to the rotational movement of the worm gear 1 starting with the situation shown in FIG. 1, it is guided in this area in its longitudinal direction and cannot deviate. The exactness of the movement is improved by this.

The areas (according to FIG. 1) lateral to the sheath 6, i.e. in the region of the arrows and of reference sign A, can be recessed in the "thickness" direction (according to FIG. 1 perpendicular to the drawing plane). This applies analogously to the regions in the vicinity of the section of the connecting rod 5 below the guide element 8, as is recognizable in FIG. 1. It is evident from FIG. 2 that in this area the guide block 9 is additionally recessed in the "thickness direction", i.e. laterally according to FIG. 2.

Figure 2:
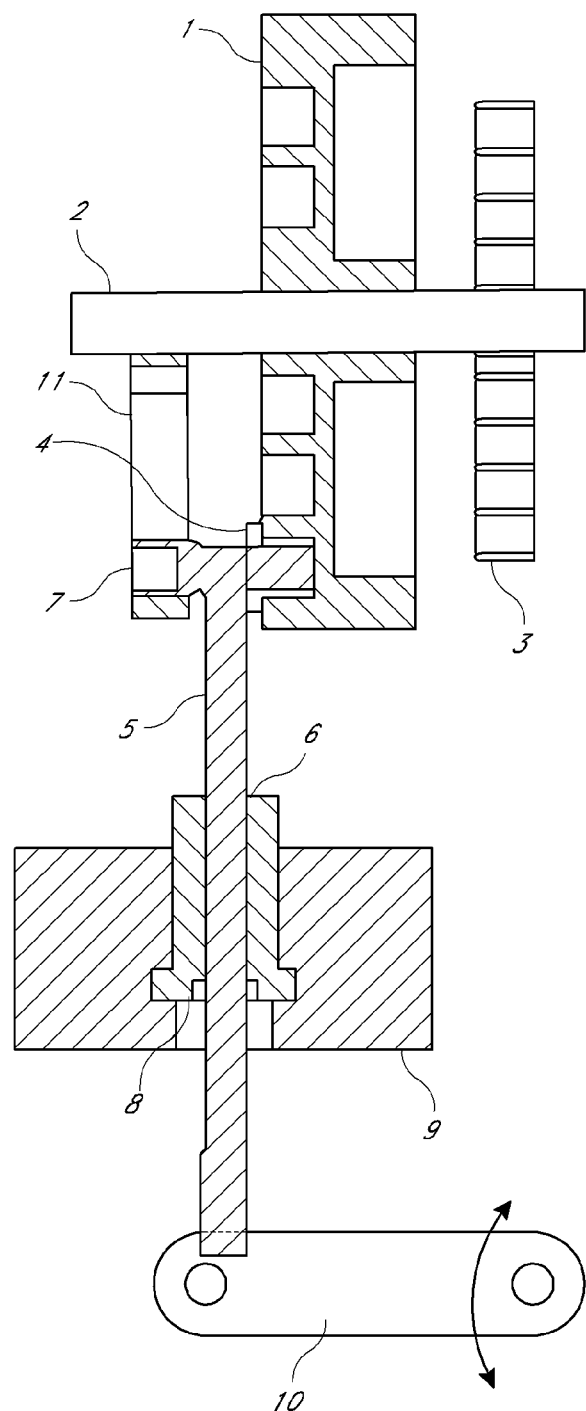
FIG. 2 illustrates the parts shown in FIG. 1 in a lateral sectioned view.

In the lateral view of FIG. 2, the rotational axle 2 of the worm element 1 is in addition recognizable which can be connected in a suitable manner with a gearwheel 3 that is driven by a wheel. The integral configuration of the guide element 8 with the sheath 6 is also evident from FIG. 2 as are also the circular-arc-shaped protrusions provided towards its lower end in the situation shown.

What is claimed is:
1. An actuator for a lever which is connected to one of a valve, a wastegate, or a variable turbine geometry of an exhaust gas turbocharger, the actuator comprising:
 a drive,
 a connecting rod between the drive and the lever, which connecting rod is rotatably supported at a location at a distance from the lever and which connecting rod is guided between the support and the lever on a circular arc, wherein the drive comprises a rotary drive and a spiral cam or a threaded element;

wherein the connecting rod is accommodated in a guide element, which is accommodated in a guide block;

a linear guide that constrains a rotatable support of the connecting rod to linear movement at a location spaced from the guide element.

2. An actuator according to claim 1, wherein the guide element comprises a sheath.

3. An actuator according to claim 1, wherein the connecting rod is supported by means of a roll.

4. An actuator according to one of claim 1, wherein a rotatable support of the connecting rod is guided in a stationary linear guide.

5. The actuator according to claim 1, wherein the guide element is movable relative to the guide block to permit pivotal movement of the connecting rod.

6. An actuator system comprising:
a connecting rod comprising a first end and a second end and defining a longitudinal axis extending therebetween;
a rotary drive comprising a threaded element, wherein the first end of the connecting rod is connected to the rotary drive such that a rotation of the rotary drive longitudinally displaces the connecting rod;
a lever, wherein the connecting rod connects to the lever at the second end such that the longitudinal displacement of the connecting rod displaces the lever;
a guide element comprising a sheath and a protrusion, wherein the connecting rod extends through the sheath;
wherein the protrusion comprises an arc having a length, a center, and a radius;
a support block configured to support the guide element, wherein the support block comprises an arcuate contour having a length, a center, and a radius and configured to receive the protrusion;
wherein the radius of the arc of the protrusion is the same as the radius of the arcuate contour, wherein the arcuate contour comprises a groove.

7. The actuator system of claim 6, wherein the length of the groove is larger than the length of the protrusion such that the protrusion can move within the groove relative to the center of the arcuate contour.

8. The actuator system of claim 7, wherein the lever is rotatable about a point such that the longitudinal displacement of the connecting rod results in the rotation of the lever.

9. The actuator system of claim 8, wherein the support block is positioned relative to the lever such that the rotation of the lever results in the movement of the protrusion in the groove relative to the center of the arcuate contour.

10. The actuator system of claim 6, further comprising a linear guide.

11. The actuator system of claim 10, wherein the linear guide is stationary relative to the rotary drive and relative to the connecting rod.

12. The actuator system of claim 11, wherein the linear guide directs the movement of the first end of the connecting rod when the rotary drive is rotated.

13. The actuator system of claim 12, wherein the guide element is movable to permit pivotal movement of the connecting rod at a location spaced from the linear guide.

14. The actuator system of claim 6, wherein the connecting rod further comprises a roll.

15. The actuator system of claim 14, wherein the roll is located at the first end of the connecting rod and contacts the rotary drive.

16. The actuator system of claim 6, wherein the threaded element comprises a spiral-shaped contour.

17. The actuator system of claim 16, wherein the threaded element comprises a spiral cam.

* * * * *